United States Patent

Strangways et al.

[11] Patent Number: 5,487,961
[45] Date of Patent: Jan. 30, 1996

[54] SINTERED METAL ELECTRODE

[75] Inventors: Bradley D. Strangways; Dale E. Ritter, both of Gainesville, Fla.

[73] Assignee: Eveready Battery Company, Inc., St. Louis, Mo.

[21] Appl. No.: 248,590

[22] Filed: May 24, 1994

Related U.S. Application Data

[63] Continuation of Ser. No. 873,479, Apr. 24, 1992, abandoned.

[51] Int. Cl.⁶ .............................. H01M 4/36; H01M 4/64
[52] U.S. Cl. ............................ 429/223; 429/94; 429/233; 429/245
[58] Field of Search ..................................... 429/223, 233, 429/45, 241, 236, 235, 222, 94, 245

[56] References Cited

U.S. PATENT DOCUMENTS

| | | | |
|---|---|---|---|
| 3,759,746 | 9/1973 | McCallum | 429/223 X |
| 4,189,533 | 2/1980 | Sugalski | 429/223 |
| 4,460,666 | 7/1984 | Dinkler et al. | 429/241 X |
| 4,606,982 | 8/1986 | Nelson et al. | 429/246 X |
| 4,837,119 | 6/1989 | Ikoma et al. | 429/223 X |
| 4,929,519 | 5/1990 | Catotti | 429/222 X |
| 5,064,735 | 11/1991 | Rampel et al. | 429/222 X |
| 5,248,572 | 9/1993 | Shoji et al. | 429/235 X |

FOREIGN PATENT DOCUMENTS

| | | |
|---|---|---|
| 58235071 | 7/1985 | Japan . |
| 60-133655 | 7/1985 | Japan . |
| 5-78141 | 9/1993 | Japan . |

*Primary Examiner*—John S. Maples
*Attorney, Agent, or Firm*—Robert W. Welsh

[57] ABSTRACT

A sintered metal electrode includes an electrically conductive substrate, a sintered metal plaque disposed on the substrate, and an electrochemically active material. The surface of the metal plaque is scored to reduce compression resistance upon winding of the electrode.

15 Claims, 1 Drawing Sheet

SINTERED METAL ELECTRODE

This application is a continuation of our application Ser. No. 07/873,479 filed Apr. 24, 1992, now abandoned.

BACKGROUND OF THE INVENTION

1. Field of the Invention

This invention relates to sintered metal electrodes for electrochemical cells and, more particularly, to flexible sintered metal electrodes which are capable of being wound in a jelly-roll configuration for use in rechargeable electrochemical cells. Specifically, the present invention relates to improvements in such sintered metal electrodes, and in particular sintered nickel electrodes, which enhances flexibility and reduces short circuiting resulting from the winding process.

2. Description of the Prior Art

Sintered metal electrodes are used in a wide variety of electrochemical cells. In a preferred form, sintered nickel metal electrodes are highly preferred electrode forms for use both in nickel-cadmium electrochemical cells as well as nickel metal hydride cells. In typical fashion, a sintered metal electrode is formed by sintering the metal powder, such as nickel, at elevated temperatures onto a metal substrate and then impregnating the porous sintered structure with the desired active material. In the case of nickel electrodes, this active material may be in form of nickel hydroxide as well as in other forms. Other active materials may also include binders, such as polytetrafloroethylene, as well as a conductive diluents such as graphite powder or fibers or metal powder. Other metal hydroxides have also been incorporated for use as the active material and are well known in the art.

While electrodes can be formed into a number of different configurations for use in electrochemical cells, a highly utilized configuration is the jelly-roll pattern used in alkaline cells as well as rechargeable nickel cadmium and nickel metal hydride cells and the like. U.S. Pat. No. 4,929,519 and U.S. Pat. No. 4,606,982 both disclose such typical jelly-roll configurations for use in can-shaped cells. U.S. Pat. No. 5,064,735 also discloses such a configuration and the contents of this patent are specifically incorporated herein by reference.

While a wide variety of electrode types, such as sintered as well as pressed or extruded paste electrodes, are utilized in such jelly-roll configurations, sintered metal electrodes wound into such jelly-roll configurations face certain problems. One major problem is that the sintered metal electrodes tend to be relatively inflexible after sintering. Thus, when they are wound into the jelly-roll configuration, the sintered metal material with active material impregnated therein or deposited thereon tend to crack and flake. When this cracking occurs in the extreme, material can in fact spall off the substrate and fall to the bottom of the can container, thereby removing active material from use with the electrode and reduce the capacity of the cell. In less severe situations, the sintered material nonetheless flakes and tends to cause splinters. The splinters can in fact bridge the gap between electrode winds thereby causing short circuiting. This short circuiting can be intermittent or can be continuous. If enough splintering and flaking occurs, the life and capacity of the cell can be substantially shortened due to the inflexibility of the sintered metal electrode when put into a wound configuration. As a result, efforts have been ongoing to somehow increase the flexibility of the electrode in order to reduce the flaking of the sintered material and the consequent short circuiting of the formed electrode. To date, this problem has not been satisfactorily overcome in the nickel cadmium, nickel metal hydride as well as other metal electrodes used in such electrochemical cell systems.

SUMMARY OF THE INVENTION

It is, therefore, one object of the present invention to provide an improved sintered metal electrode for rechargeable electrochemical cells.

It is another object of the present invention to provide a sintered metal electrode having improved flexibility for winding.

Yet another object of the present invention is to provide a sintered metal electrode having a reduced tendency toward electrical shorting.

To achieve the foregoing and other objects and advantages and in accordance with a purpose of the present invention, as embodied and broadly described herein, a sintered metal electrode is provided. The electrode includes an electrically conductive substrate, a sintered metal plaque disposed on the substrate, and an electrochemically active material. The electrode includes the improvement wherein the surface of the metal plaque is scored to reduce compression resistance upon winding of the electrode.

BRIEF DESCRIPTION OF THE DRAWINGS

The accompanying drawings, which are incorporated in and form a part of the specification, illustrate preferred embodiments of the present invention and together with a description, serve to explain the principles of the invention. In the drawings.

DETAILED DESCRIPTION OF THE PREFERRED EMBODIMENTS

The present invention is particularly applicable to sintered nickel electrodes useful in nickel cadmium and nickel metal hydride cells, although the invention has a broader use with respect to any type of sintered metal electrode. Therefore, while the specific embodiment will be discussed with respect to sintered nickel electrodes, any type of sintered metal electrode useful in electrochemical cells is contemplated as being within the scope of the invention.

Sintered nickel electrodes are used commercially in electrochemical cell manufacturing and generally include a porous nickel structure which is sintered to a nickel or nickel plated steel substrate. The plate 10, after impregnation with active nickel or cadmium or other type of active compounds, is then cut into electrodes and wound for use in the cylindrical cells. As previously discussed, the electrode tends to crack and delaminate thereby causing stress points in the roll which lead to higher probability of shorts and reduced life of the cell. In extreme cases, the active mass may become dislodged and trapped between the electrodes or spall off to the bottom of the cell. Depending on the size of the particle, this can cause an immediate short in the cell.

It was discovered that by scoring the surface of the electrode plate, the plate became significantly more flexible during the winding process. By increasing the flexibility of the electrode plate, the sintered nickel material tended not to crack as previously discussed due to reduction in compression resistance of the plate.

Figure 1:
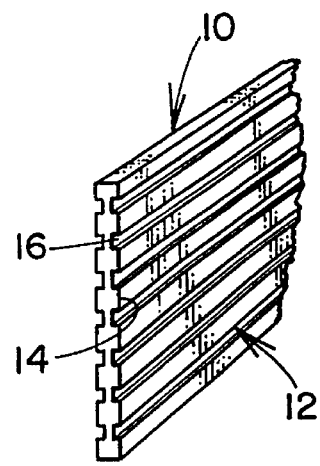
FIG. 1 is a perspective of a knurled electrode formed in accordance with the present invention.
Figure 2:
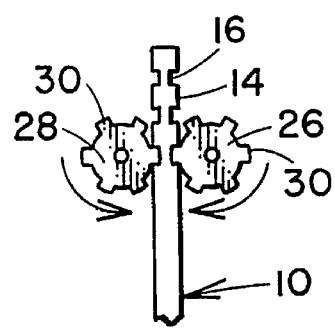
FIG. 2. is a schematic illustrating one manner of forming the electrode of the invention.
Figure 3:
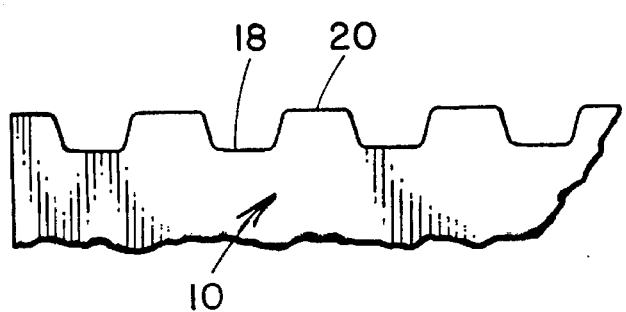
FIG. 3 is an exploded perspective of one embodiment of the invention.
Figure 4:
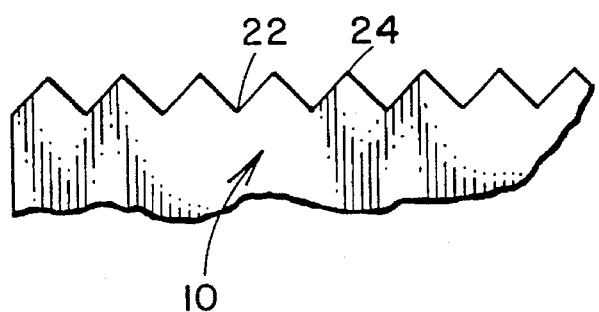
FIG. 4 is an exploded perspective of another embodiment of the invention.

Referring now to FIGS. 1–4, a sintered metal electrode 10 includes scoring 12 in the form of alternating ridges 14 and depression or valleys 16. These may be in the form of grooves 18 and adjacent land surfaces 20 or steep "V"-shaped valleys 22 alternating with peaks 24.

The alternating ridges and depressions which form the scoring can take any number of different shapes and can be formed any number of different ways. The shapes can be very sharp "V" notches formed by knife blades, or they can take the form more of a groove with adjacent land surfaces. The more preferred form is that of "V"-shaped notches or grooves with an angle of about 60° between the perpendicular at the bottom of the notch relative to the surface of the substrate and the sides of the notch for the "V" notch. The scoring can be applied by either slicing or cutting the surface of the nickel plaque, or by compressing it as described below.

In a preferred embodiment, the sintered nickel plaque is scored or grooved by using a pair of opposing rollers or gear-like members having sharp ridges perpendicular to the direction of travel. The nickel electrode substrate with the nickel plaque thereon is then run between the two rollers or gears 26, 28 to make a fine pattern of grooves in both sides of the plaque. These grooves are easily formed in soft nickel plaque before impregnation. The depth of the grooves can be adjusted by varying the spacing between the rollers 26, 28. The spacing between the grooves can be adjusted by using different size rollers with different spaced teeth 30 which create the grooves. While the depths of the grooves and spacing of the grooves can be varied as discussed below, a preferred depth is approximately 0.004–0.010 inches with approximately 0.030 inches spacing between the grooves or between ridges or land surfaces. While the actual measurements may vary depending on the thickness of the nickel plaque and the size of the electrode, it is preferred to have a ratio of groove depth to groove spacing of approximately 1:6.

The grooving or scoring can be placed on one or both sides of the electrode as desired. Moreover, the impregnation of the nickel plaque with the active material can take place either before or after scoring of the electrode. In the instance where compression is utilized to form the grooves or depressions by running the electrode between opposed toothed rollers, active material impregnation is preferred after formation of the grooves.

In addition, when the nickel plaque is compressed by using opposed rollers, the porosity of the nickel plaque is changed slightly. Therefore, in order to maintain the same cell performance and capacities, loading of the active material can be increased by one more impregnation cycle to compensate for the compression and decrease in porosity in the grooved areas. The cutting or slicing process avoids this, however, so that loading can take place more readily prior to scoring when the slicing or cutting processes is utilized to form the groove or knurled surface.

Once the electrode has been scored and loaded with active material, the electrode is wound (not shown). During the winding process, the scores or grooves of the present invention provide locations for contraction and expansion along the inside and outside of the electrode respectively. The resulting stress reduction allows the electrode to be more flexible and more readily conform to the roll curvature, thereby greatly reducing delamination of the relatively rigid nickel plaque. As a result of the present invention, premature failure and reduced cycle life is prevented due to reduction of particles in the roll which create shorting. Since the nickel plaque after impregnation tends to be relatively inflexible, the thinner the electrode plate or the larger the arbor on which the electrode is rolled, the fewer grooves that are needed. Likewise, the thicker the electrode plate or the tighter the wind due to a small arbor, the greater the number of grooves necessary in the plate to prevent flaking and delamination.

As a result of tests described in more detail below, the electrical short circuiting rate in nickel metal hydride cells was reduced by about 93% after scoring the electrode in accordance with the present invention. Thus, the present invention has shown significant improvement in the windability and suppleness of the electrode as well as in the reduction of electrical shortage. Yet another benefit of this is the potential ability to be able to wind the electrodes in a tighter bundle thereby placing more electrode material in the same size can container. This can increase capacity and/or cell life.

EXAMPLE I

Since formation of the knurled surface tends to reduce the amount of nickel plaque on the electrode, a first set of tests were conducted to determine whether the amount of loading of the electrode would be affected by using the present invention. These tests included forming the sintered nickel plaque on a nickel metal substrate and then impregnating the plaque with nickel hydroxide. Control electrodes remained unchanged after nickel impregnation, while test electrodes were subjected to paired rollers prior to impregnation to create a knurled surface of approximately 0.010 inches in depth. Both the control and test electrodes were then subjected to a series of impregnation cycles. It was determined that the average difference in loading of grooved to control electrodes was 0.58 G/DM$^2$ thereby indicating that the loading was slightly less with the present invention than the standard electrode manufacture. In order to compensate for this, it was determined that one more loading cycle was required in order to load the same amount of active material into the electrode.

EXAMPLE II

A series of tests was then performed in order to determine the optimum depth of the grooves in order to prevent spalling of nickel plaque. In this instance, electrodes were made in the form of a control, and then three test electrodes having grooved depths which varied by the spacing of the rollers, that is 0.005 inches, 0.010 inches and 0.015 inches. For example, a roller gap of 0.010 provided a groove depth of approximately 0.004–0.005. The 0.015 gap provided an even shallower groove, while the 0.005 gaps provided an even deeper groove. These electrodes were then wrapped around the same arbor for one wrap, and a percent weight loss was then determined which represented how much nickel plaque spalled off the electrode. The control had a weight loss of 1.81 percent, while the 0.015 groove had a weight loss of 1.06 percent. The 0.010 electrode and the 0.005 electrode were very similar in weight loss of 0.70 percent and 0.64 percent respectively. Thus, these tests indicated that the 0.015 spaced groove or greater, ie., shallow grooves, provided the greater amount of plaque flaking.

EXAMPLE III

The series of tests were then performed in order to measure the electrical short circuiting rate in canned rolls without electrolyte to determine the optimum groove depth. In this instance, nickel cadmium AA cells of 800 mA/hr. were tested having a control electrode and electrodes with roller gaps of 0.015, 0.010 and 0.005 inches. A voltage was placed across the positive and negative, and then the leakage current was measured. The results of these tests clearly indicated that both the control and the 0.015 gap had a 3 percent or better rejection, while the 0.010 and 0.005 gap had a 0.7 percent and 0.9 percent, respectively, rejection. Thus, it was clear from these tests that the grooves in the electrode formed as a result of the present invention provided significant results, and that the groove needed to be approximately 0.010 inches in depth or greater in order to provide such results.

As can be seen from the above, the present invention provides a simple yet very effective way of reducing electrical short circuiting in sintered metal electrodes. This is particularly important in the nickel cadmium and nickel metal hydride cell technology. The present invention is easy to construct yet provides significant performance advantages in the form of reduction of cell shorting. This is achieved without affecting the other performance parameters of the cell, such as cell capacity and cell life. In fact, cell life of cells incorporating electrodes constructed in accordance with the present invention are anticipated to be enhanced due to retaining the integrity of the electrodes in a more effective and efficient way during construction of the electrodes and cells. Consequently, the present invention permits the electrodes to be more susceptible to conformation for rolling while simultaneously reducing stress in the electrode which has previously caused delamination and shortages.

The foregoing description and the illustrative embodiments of the present invention have been described in detail in varying modifications and alternate embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

What is claimed is:

1. A flexible sintered metal electrode for use in a rechargeable cell, comprising:
   a) an electrically conductive substrate having a longitudinal axis;
   b) a sintered metal plaque deposited on said substrate and transversely scored relative to said substrate's longitudinal axis; and
   c) electrochemically active material associated with said plaque.

2. A flexible sintered metal electrode, as described in claim 1, wherein said metal plaque comprises nickel.

3. A flexible sintered metal electrode, as described in claim 1, wherein said scoring comprises alternatively arranged ridges and depressions.

4. A flexible sintered metal electrode, as described in claim 3, wherein said alternate ridges and depressions are in the form of grooves spaced by land surfaces.

5. A flexible sintered metal electrode, as described in claim 3, wherein the ratio of the depth of said depressions to spacing between said depressions is approximately 1:6.

6. A flexible sintered metal electrode, comprising:
   a) an electrically conductive substrate having a longitudinal axis;
   b) a sintered metal plaque disposed on said substrate and comprising scores aligned substantially perpendicular to the longitudinal axis of said substrate; and
   c) an electrochemically active material impregnated in said sintered metal plaque.

7. A flexible sintered metal electrode, as described in claim 6, wherein said metal plaque comprises nickel.

8. A flexible sintered metal electrode, as described in claim 6, wherein said scoring comprises alternatively arranged ridges and depressions.

9. A flexible sintered metal electrode, as described in claim 8, wherein said alternate ridges and depressions are in the form of grooves spaced by land surfaces.

10. A flexible sintered metal electrode, as described in claim 8, wherein the ratio of the depth of said depressions to spacing between said depressions is approximately 1:6.

11. An electrochemical cell comprising a flexible sintered metal electrode, said electrode comprising:
    a) an electrically conductive substrate having a longitudinal axis;
    b) a sintered metal plaque disposed on said substrate and comprising scores aligned substantially perpendicular to the longitudinal axis of said substrate; and
    c) an electrochemically active material impregnated in said sintered metal plaque.

12. A flexible sintered metal electrode, as described in claim 11, wherein said metal plaque comprises nickel.

13. A flexible sintered metal electrode, as described in claim 11, wherein said scoring comprises alternatively arranged ridges and depressions.

14. A flexible sintered metal electrode, as described in claim 13, wherein said alternate ridges and depressions are in the form of grooves spaced by land surfaces.

15. A flexible sintered metal electrode, as described in claim 13, wherein the ratio of the depth of said depressions to spacing between said depressions is approximately 1:6.

* * * * *